United States Patent [19]

Paitich et al.

[11] 4,314,205
[45] Feb. 2, 1982

[54] METHOD AND MEANS FOR VACUUM GAUGING

[76] Inventors: Ronald M. Paitich, 639 Paco Dr., Los Altos, Calif. 94022; Donald D. Briglia, 849 Timlott La., Palo Alto, Calif. 94306

[21] Appl. No.: 95,406

[22] Filed: Nov. 19, 1979

[51] Int. Cl.³ .................................... G01N 27/00
[52] U.S. Cl. ............................... 324/460; 324/462
[58] Field of Search ............................. 324/460, 462

[56] References Cited

U.S. PATENT DOCUMENTS

| | | | |
|---|---|---|---|
| 3,253,183 | 5/1966 | Van Oostrom | 324/462 |
| 3,394,286 | 7/1968 | Brook | 324/462 |
| 3,399,341 | 8/1968 | Banas et al. | 324/460 |
| 3,495,165 | 2/1970 | Cobine et al. | 324/460 |

OTHER PUBLICATIONS

E. W. Blauth, "An Ionization Gauge for the Pressure Range $10^{-5}$ to 10 Tor, Inst. für Plasmaphgaik, GmbH, Garching-Munich, Oct. 28, 1969, 29 Bd, Heft 1, 1970, pp. 70–73.

*Primary Examiner*—Michael J. Tokar
*Attorney, Agent, or Firm*—Flehr, Hohbach, Test

[57] ABSTRACT

The operating range of an ionization tube vacuum gauge is increased by applying at least two different bias voltages to the tube and measuring ion current for the two bias voltages. The ratio of the ion currents indicates vacuum pressure in the range of $10^{-1}$ to above 2 Torr. An ionization tube vacuum gauge provides a pressure read-out by the linear ion current response of an ionization tube between $10^{-10}$ Torr and $10^{-2}$ Torr. The non-linearity of the ion current response between $10^{-2}$ Torr and $10^{-1}$ Torr is compensated by a non-linear amplifier. Above $10^{-1}$ Torr the ratio of ion currents is utilized for determining pressure.

17 Claims, 6 Drawing Figures

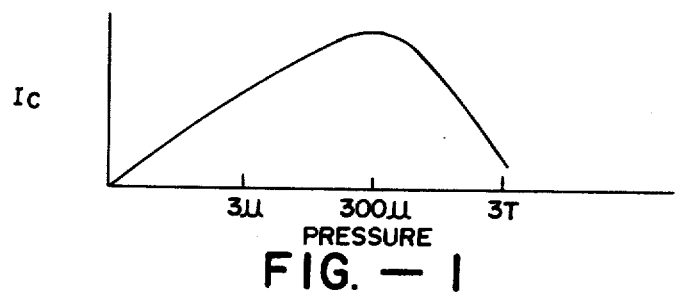
FIG. — 1
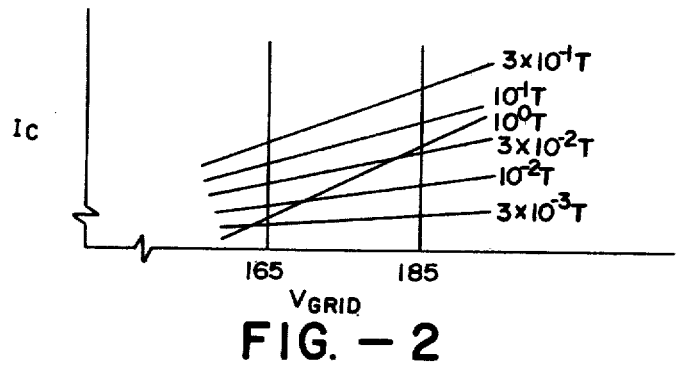
FIG. — 2
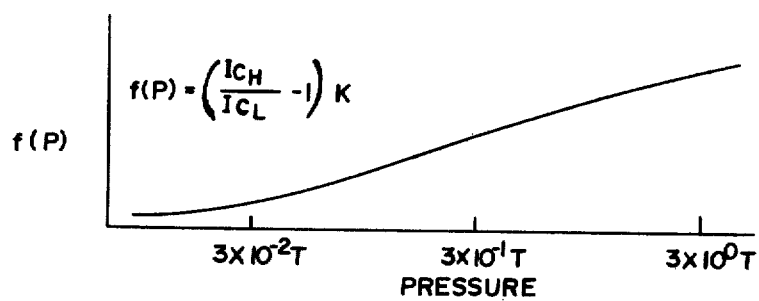
FIG. — 3
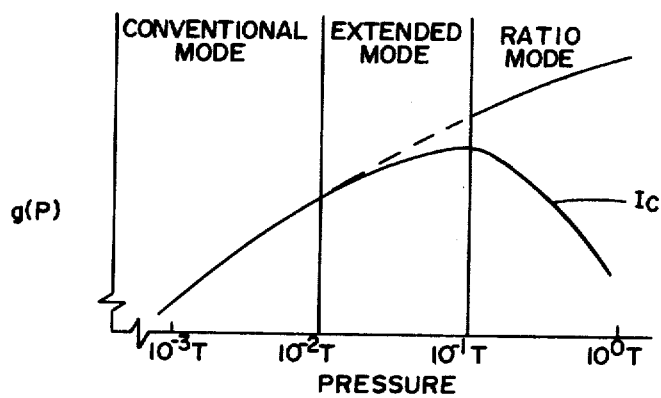
FIG. — 4

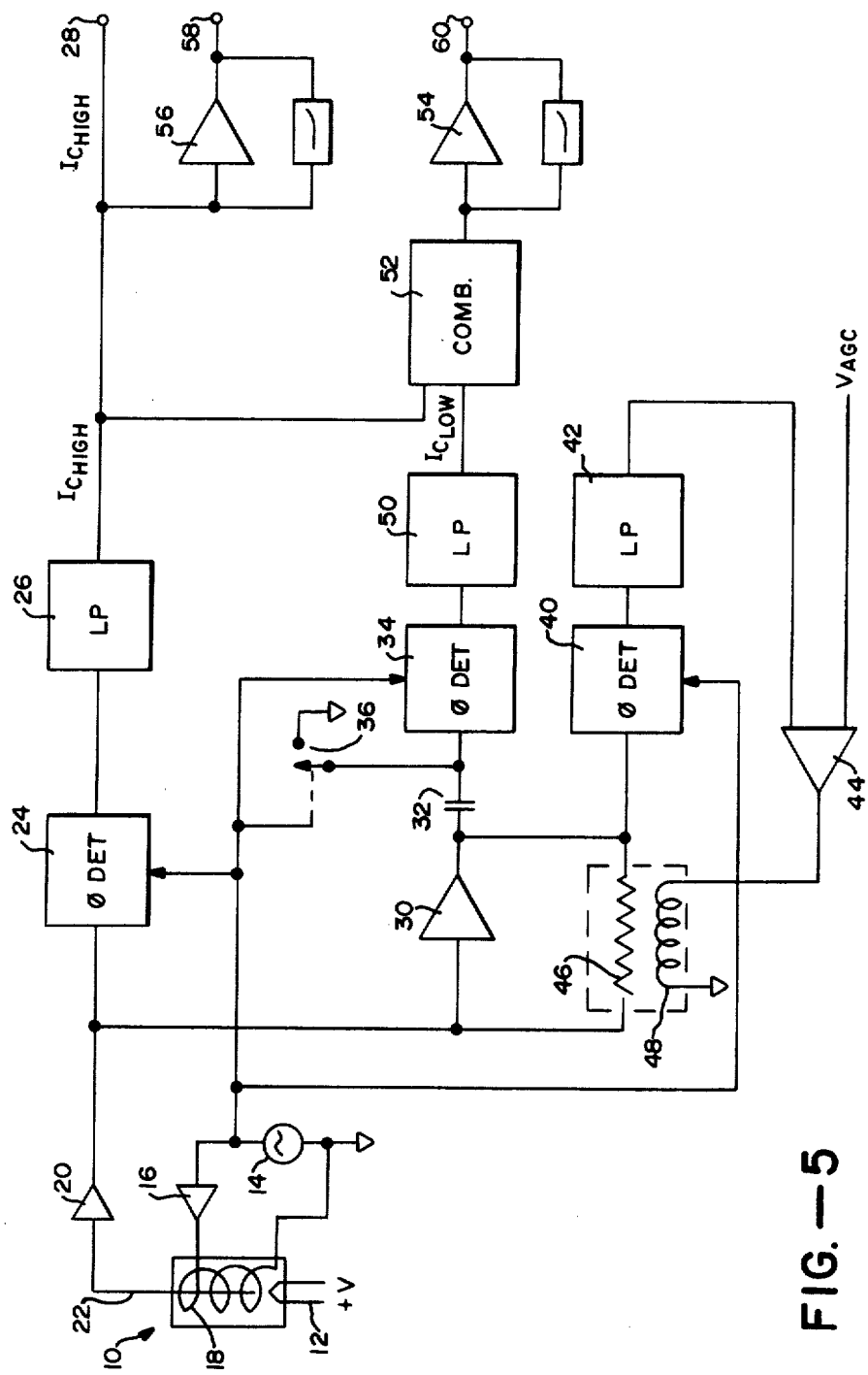
FIG.—5

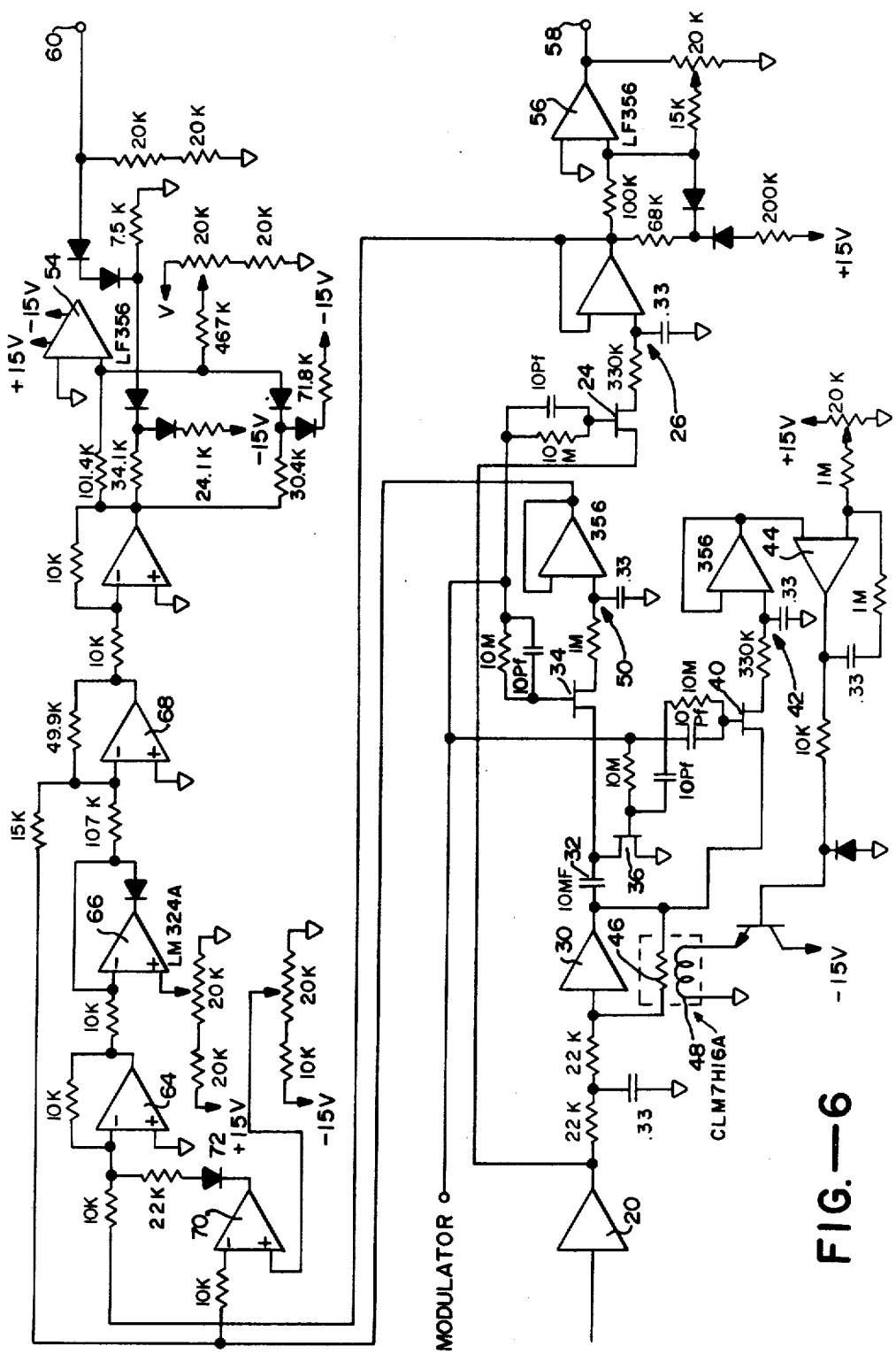
FIG.—6

METHOD AND MEANS FOR VACUUM GAUGING

This invention relates generally to vacuum measurements, and more particularly the invention relates to am improved method and apparatus for wide range vacuum gauging by means of an ionization tube.

Ionization tube vacuum gauges are well known in the art for measuring vacuum. For example, the Bayard-Alpert ionization tube is employed for measurements in ultra high vacuum (e.g. $10^{-10}$ Torr) up to $10^{-2}$ Torr. As described in U.S. Pat. No. 3,839,655, such ionization tubes have filaments for emitting electrons and a positively charged grid for accelerating the emitted electrons. The electrons collide with gas molecules in the vacuum and generate additional electrons and positive ions. A collector electrode at a lower electrical potential collects the ions. By measuring ion current the vacuum pressure can be determined.

The ionization tube has a generally linear response of ion current to vacuum pressure between $10^{-10}$ Torr and $10^{-2}$ Torr pressure. However, above $10^{-2}$ Torr the response becomes non-linear due to the increased collisions of electrons with gas molecules. At still higher pressures the collector current reaches a maximum, and above approximately 0.3 Torr the collector current begins to decrease, thus resulting in a double value curve and consequently leading to ambiguous interpretations of collector current measurements. Accordingly, the ionization tube is conventionally employed with auxiliary low vacuum gauges such as thermocouple or thermistor vacuum gauges to extend the range of the pressure measuring instrument up to several Torr.

An object of the present invention is an improved method of measuring vacuum pressure.

Another object of the invention is a method of operating an ionization tube whereby the range of pressure measurements is increased.

Still another object of the invention is vacuum measuring apparatus utilizing an ionization gauge over an increased vacuum range.

Yet another object of the invention is an ionization tube vacuum gauge operable over an extended pressure range without use of an auxiliary low pressure gauge.

A feature of the invention is the use of a plurality of biasing voltages to determine ion current ratios at pressures above the range of ion current linearity of an ionization tube.

Briefly, a vacuum gauge in accordance with the invention includes an ionization tube which exhibits a linear response of ion current to vacuum pressure up to a particular pressure level. Means is provided for applying at least two different biasing voltages to the ion tube whereby at least two different ion currents can be measured at vacuum levels above the pressure level of linear response. By utilizing the ratios of at least two ion currents, at different bias voltages, the vacuum pressure can be determined without use of auxiliary sensors or gauges.

In accordance with another feature of the invention the pressure near the level of maximum level of linear response is determined by averaging a pressure as determined by assuming linearity of the ion tube and a pressure obtained by ion current ratios.

In accordance with another feature of the invention, circuitry is provided to maintain the measurement of the lower ion current constant whereby the higher ion current measurement is indicative of vacuum pressure.

These and other objects and features of the invention will be more readily apparent from the following detailed description and appended claims when taken with the drawing, in which:

FIG. 1 is a plot of ion current versus pressure for the conventional ionization tube vacuum gauge.

FIG. 2 is a plot of ion current versus grid voltage in a conventional ionization tube vacuum gauge.

FIG. 3 is a plot of a function of pressure, f(P) versus pressure for an ionization tube as used in accordance with the present invention.

FIG. 4 is a plot of a measured function of pressure, g(P), versus pressure which illustrates the several operation modes of a pressure gauge in accordance with the invention.

FIG. 5 is a functional block diagram of apparatus for measuring vacuum pressure over an extended pressure range in accordance with one embodiment of the present invention.

FIG. 6 is a detailed schematic of the apparatus shown in FIG. 5.

The conventional ionization tube includes a heated filament, a grid which is positively biased for accelerating electrons emitted from the heated filament, and an ion collector which is biased more negatively than the grid. In the Bayard-Alpert tube, the grid is a helical coil and the ion collector is a fine wire inside of the grid.

FIG. 1 is a plot of ion current, $I_C$, versus pressure for the conventional ionization tube. As shown, the curve is linear from ultra high vacuum ($10^{-10}$ Torr) to about $10^{-3}$ Torr. Above $10^{-3}$ Torr the response becomes non-linear, and above $10^{-1}$ Torr the ion current begins decreasing with increasing pressure.

The usefulness of the inoization tube can be increased up to about $10^{-1}$ Torr by providing circuitry which compensates for the non-linear response of the ionization tube between $10^{-3}$ and $10^{-1}$ Torr. However, above $10^{-2}$ Torr auxiliary sensors have heretofore been employed, as discussed above.

In the range of $10^{-10}$ to $10^{-3}$ Torr the ion current is relatively insensitive to variation in grid voltage; however, above $10^{-3}$ Torr the ion current becomes increasingly sensitive to grid voltage. FIG. 2 is a plot of grid voltage, $V_{grid}$, versus ion current, $I_C$, for pressures from $10^0$ Torr down to $10^{-3}$ Torr where ion current becomes essentially independent of grid voltage. At $10^{-2}$ Torr and above the slopes of the curves begin increasing as the ion current becomes increasingly dependent on grid voltage with increasing vacuum pressure. Thus, the ratio of ion current at 185 volt grid voltage to ion current at 165 volt grid voltage, or the slope of the ion current ratio, increases with the pressure. While the magnitude of ion current for a given grid voltage decreases with pressure increases above $10^{-3}$ Torr, the slope of the ion current ratio curve continues to increase, as illustrated by FIG. 3.

Thus, the magnitude of the ion current ratio is indicative of vacuum pressure. Accordingly, by varying the bias voltage on at least one element of the ionization tube, such as the grid voltage in a Bayard-Alpert tube, and measuring the ratio of the ion currents at the two voltages, the range of the ion tube can be extended well beyond the linear range of ion current versus pressure.

FIG. 3 is a plot of the ratio of ion current at two voltage levels versus pressure with the ratio function, f (I), being given by the equation $$f(l) = \left( \frac{I_{CH}}{I_{CL}} - 1 \right) K$$

where
$I_{CH}$ = ion current at the higher grid voltage
$I_{CL}$ = ion current at the lower grid voltage
K = amplification factor From this plot, it will be seen that the ratio of ion current at two grid voltage levels, increases monotonically above $3 \times 10^{-2}$ Torr.

Thus, in accordance with the present invention, the linear response of ion current versus pressure up to $10^{-2}$ Torr is used along with the response of the ratio of ion currents at two voltage levels at pressures above $10^{-1}$ Torr to extend the linear response of an ionization tube to higher pressure levels without the use of an auxiliary sensor. Between $10^{-2}$ Torr and $10^{-1}$ Torr non-linear circuitry is provided to compensate for the non-linear ion current. FIG. 4 is a plot of a measured function of pressure versus vacuum pressure which illustrates these three modes of operation of an ionization tube vacuum gauge in accordance with the invention.

FIG. 5 is a schematic diagram of an embodiment of apparatus for wide range vacuum gauging in accordance with the present invention. A conventional ionization tube 10, such as the Bayard-Alpert tube, has a filament 12 which is energized to emit electrons. Typically, filament voltage is +30 volts and emits current of about 10 microamps. An oscillator 14 and amplifier 16 provide a positive voltage to the grid 18. In one embodiment the oscillator produces a pulse train at 27 Hz and amplifier 16 amplifies the pulse train whereby the grid voltage alternates between +165 volts and +185 volts. A conventional electrometer amplifier 20 is connected to the ion collector 22 and generates an output voltage proportional to the ion current from collector 22.

Electrometer 20 is serially connected with a phase detector 24 and low pass filter 26 to provide an output at 28 representative of the ion current at the higher voltage applied to grid 18, or at grid voltage of +185 volts. The output of amplifier 20 is also connected to a variable gain amplifier 30 which is serially connected through capacitor 32 to a phase detector 34. A switch 36 periodically grounds one terminal of capacitor 32. The output of amplifier 30 is also serially connected with a phase detector 40, a low pass filter 42, and reference voltage amplifier 44 to control the photosensitive variable resistor 46 in the feedback path of amplifier 30 by means of a lamp 48.

Phase detector 24 is controlled by square wave modulator 14 whereby voltage from amplifier 20 corresponding to the ion current at the higher grid voltage is passed through low pass filter 26 to output 28. Low pass filter 26 removes the modulation frequency (27 Hz) of modulator 14. Switch 36 and phase detector 40 are controlled by square wave modulator 14 whereby the switch is grounded during application at the lower grid voltage and voltage is detected by detector 40 during the time that the lower grid voltage (165 volts) is applied to grid 18.

The control loop comprising phase detector 40, low pass filter 42, and the differential amplifier 44 maintain a relatively constant output on amplifier 30 for the lower bias voltage as the ion current decreases in magnitude as higher vacuum pressures are encountered.

Thus, the voltage appearing across capacitor 32 is maintained at an adjusted level to compensate for the actual dropoff in ion current at the higher pressures. Since capacitor 32 is grounded through switch 36 during the period of lower grid voltage, the voltage across the capacitor is the voltage corresponding to the higher grid voltage less the voltage corresponding to the lower grid voltage or $$V_C = K(I_{CH} - I_{CL})$$

and since $I_{CL}$ is maintained constant, then $$V_C = K' \left( \frac{I_{CH}}{I_{CL}} - 1 \right)$$

where $K' = K/I_{CL}$

The voltage ($V_{ICH}$) corresponding to ion current at the higher grid voltage from low pass filter 26 and the signal corresponding to the ratio of voltages from low-pass filter 50 are applied as input voltages to a combination circuit 52 which provides an output signal which is an average of the two input voltages when the two input voltages are approximately equal (during a measured pressure of $10^{-1}$ Torr) and which corresponds to the ratio of voltages from low pass filter 50 when $V_{ICH}$ decreases at pressures above $10^{-1}$ Torr.

The output from combination circuit 52 is then applied to amplifier 54 having a non-linear feedback which provides variable gain as the ratio signal increases at increasing vacuum pressures.

Thus, in the pressure range of $10^{-10}$ Torr to $10^{-2}$ Torr where the ionization tube 10 provides a linear readout, the gauge output is taken at terminal 28. In the range of approximately $10^{-2}$ Torr to $10^{-1}$ Torr, the signal at terminal 28 is applied through a non-linear amplifier 56 having a non-linear feedback whereby the non-linearity of ionization current in this pressure range is compensated at output terminal 58. For higher pressure above $10^{-1}$ Torr, the output signal is taken at output terminal 60 from amplifier 54. As above described, from $10^{-2}$ Torr to $10^{-1}$ Torr the signal on terminal 60 is an average of the signal of terminal 28 and the ratio signal, and above $10^{-1}$ Torr the signal on terminal 60 is the ratio signal.

FIG. 6 is a more detailed schematic of the circuit of FIG. 5, and like elements have the same reference numerals. The circuitry is conventional and operation thereof corresponds to the above description. The combination circuit shown at 52 comprises cascaded amplifiers 64, 66, and 68, with amplifier 64 receiving the $V_{ICH}$ input from low pass filter 26. Amplifier 70 receives the ratio signal from low pass filter 50 and a reference voltage, and the output of amplifier 70 is applied through reverse bias diode 72 to the input of amplifier 64. The $V_{ICH}$ signal from low pass filter 26 is applied to amplifier 64 until the ratio signal input to amplifier 70 exceeds the reference potential input which is set at a level corresponding to vacuum pressure of approximately $2 \times 10^{-1}$ Torr. Thus, amplifier 64 responds to $V_{ICH}$ up to the pressure level of approximately $2 \times 10^{-1}$ Torr and thereafter the input to amplifier 64 is essentially the ratio voltage from low pass filter 50. The output of amplifier 64 is passed through amplifier 66 and averaged with the ratio signal from low pass filter 50 at the input to amplifier 68. Thus, amplifier 68 provides an output signal which is an average of the ratio signal from low pass filter 50 and the $V_{ICH}$ signal from low pass filter 26 up to approximately $2 \times 10^{-1}$ Torr and thereafter the output of amplifier 68 corresponds to the ratio signal from low pass filter 50. This signal is then applied to the non-linear amplifier 54 and to output terminal 60. The gain of amplifier 54 increases as the input signal decreases due to increased input bias through the diode matrix in the feedback path. Similarly the gain of amplifier 56 is variable due to a diode biasing network.

The method of measuring vacuum pressure using an ionization tube in accordance with the present invention increases the operable range of the ionization tube and obviates the need for auxiliary low vacuum gauges.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. The method of measuring vacuum pressure with an ionization tube having a plurality of elements which are voltage biased whereby electrons are emitted and collide with gas molecules to form ions and whereby ions are collected by one of said elements comprising the steps of:

varying the voltage applied to at least one of said elements between a plurality of voltage levels, measuring ion current at said plurality of voltage levels, and determining vacuum pressure from a function of the ratio of ion currents at said plurality of voltage levels.

2. The method of measuring vacuum pressure with an ionization tube having a plurality of elements which may be voltage biased whereby electrons are emitted and collide with gas molecules to form ions and whereby ions are collected by one of said elements, comprising the steps of:

applying bias voltage to said elements, measuring ion current, varying the voltage applied to at least one of said elements between a plurality of voltage levels, measuring ion current at said plurality of voltage levels, and determining vacuum pressure from the ratio of ion currents at said plurality of voltage levels.

3. The method of measuring vacuum pressure as defined by claim 2 and further including the step of adjusting the gain of the means for measuring ion current whereby measurement of ion current at a lower of said plurality of voltage levels remains constant and whereby said measured ion current at a higher of said plurality of voltage levels provides a direct indication of ion current ratio.

4. The method of measuring vacuum pressure as defined by claim 2 wherein said step of applying bias voltages includes applying said plurality of voltages to said one of said elements.

5. The method of measuring vacuum pressure as defined by claim 1 wherein said function is defined by $$\left(\frac{I_{CH}}{I_{CL}} - 1\right) K$$

where
$I_{CH}$ is ion current at a higher voltage level
$I_{CL}$ is ion current at a lower voltage level
K is a gain factor.

6. Apparatus for measuring vacuum pressure comprising an ionization tube having a plurality of elements including an electron emitter element, an electron collector element, and an ion collector element, means for applying bias voltages to said elements whereby electrons are emitted and ions are collected, means for measuring ion current at a plurality of voltage levels on at least one of said elements, and means for determining vacuum pressure from the ratio of ion current at said plurality of voltage levels.

7. Apparatus as defined by claim 6 wherein said tube comprises a Bayard-Alpert tube having a filament for emitting electrons, a grid for collecting electrons, and a collector for collecting ions, and wherein voltage on said grid is varied between said plurality of voltage levels.

8. Apparatus as defined by claim 6 wherein said means for measuring ion current includes gain adjustment means whereby measurement of the lower ion current remains constant and whereby measurements of the higher ion current provides a direct indication of ion current ratio.

9. Apparatus as defined by claim 6 wherein said means for applying bias voltage comprises a voltage modulator for applying said plurality of voltage levels to at least one of said elements.

10. Apparatus as defined by claims 6 or 9 whereby said means for determining vacuum pressure includes non-linear amplification means for compensating for non-linear response of said ionization tube.

11. Apparatus as defined by claim 10 and further including second means for determining vacuum pressure from measure of ion current in a first pressure range, and means for determining vacuum pressure in a second pressure range by averaging the output from said second means and the output from said means for determining vacuum pressure from the ratio of ion current.

12. Apparatus as defined by claim 9 wherein said means for measuring ion current includes detector means for detecting and measuring ion current only during the application of a fixed level of bias voltage.

13. Apparatus for measuring vacuum pressure comprising:

an ionization tube, an electrometer connected with said ionization tube for providing a signal indicative of ion current in said ionization tube, means for varying bias voltage to said ionization tube, and means for determining pressure based on ion currents in said ionization tube in response to varying bias voltage in accordance with $$K\left(\frac{I_{CH}}{I_{CL}} - 1\right)$$

where $I_{CH}$ = ion current at a higher bias voltage
$I_{CL}$ = ion current at a lower bias voltage.

14. Apparatus as defined by claim 13 and further including linear means for determining pressure from $10^{-10}$ Torr to $10^{-2}$ Torr based on ion current, and non-linear means for determining pressure from $10^{-2}$ Torr to $10^{-1}$ Torr based on ion current.

15. Apparatus as defined by claim 14 wherein said means for determining pressure based on ion currents in said ionization tube in response to varying bias voltage determines pressure from $10^{-1}$ Torr to 2 Torr.

16. Apparatus as defined by claim 15 wherein said means for detemining pressures based on ion currents further including means for utilizing the output from said non-linear means in determining pressure whereby continuity of measured pressure is maintained.

17. Apparatus as defined by claim 13, 15, or 16 wherein said means for determining pressure comprises a variable gain amplifier having an input connected to the output of said electrometer, capacitive means connected to the output of said amplifier, a phase detector with an input connected to said capacitive means, and low pass filter means connected to the output of said phase detector, means for periodically grounding said capacitive means whereby a voltage differential between a higher voltage and a lower voltage is obtained, means controlling said phase detector whereby said voltage differential is measured, and means for controlling said variable gain amplifier whereby said lower voltage remains essentially constant.

* * * * *